(12) United States Patent
Sullivan et al.

(10) Patent No.: US 9,014,558 B2
(45) Date of Patent: *Apr. 21, 2015

(54) CLIENT GROOMING INTERFACE

(71) Applicants: Edward T Sullivan, Highland Village, TX (US); Hal V Kauffeldt, Plano, TX (US)

(72) Inventors: Edward T Sullivan, Highland Village, TX (US); Hal V Kauffeldt, Plano, TX (US)

(73) Assignee: Techsys Insights, Plano, TX (US)

( * ) Notice: Subject to any disclaimer, the term of this patent is extended or adjusted under 35 U.S.C. 154(b) by 80 days.

This patent is subject to a terminal disclaimer.

(21) Appl. No.: 14/022,820

(22) Filed: Sep. 10, 2013

(65) Prior Publication Data
US 2015/0071634 A1 Mar. 12, 2015

Related U.S. Application Data

(63) Continuation-in-part of application No. 13/490,314, filed on Jun. 6, 2012.

(51) Int. Cl.
| | |
|---|---|
| *H04B 10/27* | (2013.01) |
| *H04B 10/50* | (2013.01) |
| *H04B 10/60* | (2013.01) |
| *H04L 12/24* | (2006.01) |
| *H04L 12/721* | (2013.01) |

(52) U.S. Cl.
CPC .............. *H04L 41/18* (2013.01); *H04B 10/27* (2013.01); *H04L 45/44* (2013.01)

(58) Field of Classification Search
CPC ..... H04J 14/02; H04J 14/0221; H04J 14/023; H04J 14/0239; H04J 14/0242; H04J 14/0254; H04J 14/0273; H04J 14/0275; H04J 14/278; H04B 10/25; H04B 10/272; H04B 10/40
USPC ........... 398/79, 135, 137, 138, 140, 162, 182, 398/202
See application file for complete search history.

(56) References Cited

U.S. PATENT DOCUMENTS

| | | | | |
|---|---|---|---|---|
| 6,577,414 | B1 * | 6/2003 | Feldman et al. | 398/43 |
| 6,594,047 | B1 * | 7/2003 | Ballintine et al. | 398/79 |
| 6,629,638 | B1 * | 10/2003 | Sanchez | 235/454 |
| 6,674,967 | B2 * | 1/2004 | Skrobko et al. | 398/72 |
| 6,882,765 | B1 * | 4/2005 | Erickson et al. | 385/16 |
| 7,190,896 | B1 * | 3/2007 | Wang et al. | 398/30 |
| 7,254,333 | B2 * | 8/2007 | Shimizu | 398/79 |
| 7,305,184 | B2 * | 12/2007 | Tian et al. | 398/33 |
| 7,317,874 | B2 * | 1/2008 | Li et al. | 398/72 |
| 7,394,981 | B2 * | 7/2008 | Manifold | 398/17 |
| 7,460,482 | B2 * | 12/2008 | Pike | 370/241 |
| 7,493,042 | B2 * | 2/2009 | Li et al. | 398/68 |
| 7,761,010 | B2 * | 7/2010 | Crosby et al. | 398/136 |
| 7,773,539 | B2 * | 8/2010 | Gerstel | 370/254 |
| 7,778,544 | B2 * | 8/2010 | Hinderthur | 398/25 |
| 7,933,518 | B2 * | 4/2011 | Li et al. | 398/22 |
| 7,945,160 | B2 * | 5/2011 | Hinderthur | 398/33 |
| 7,957,650 | B2 * | 6/2011 | Pan et al. | 398/135 |
| 7,983,560 | B2 * | 7/2011 | Maki et al. | 398/50 |

(Continued)

*Primary Examiner* — Darren E Wolf (57) ABSTRACT

The invention is directed to apparatus, systems and methods enabling a service provider to establish an optical demarcation point located at or within equipment controlled at least in part by a customer's domain such that the service provider's domain is able to directly control access of an optical signal to their domain based upon at least one optical signal characteristic and at least one of mapping and multiplexing properties pertaining to one or more information flows within said optical signal.

21 Claims, 11 Drawing Sheets

(56) References Cited

U.S. PATENT DOCUMENTS

| | | | |
|---|---|---|---|
| 8,155,526 B2* | 4/2012 | Gray | 398/116 |
| 8,280,249 B2* | 10/2012 | Friedrich et al. | 398/33 |
| 8,406,630 B2* | 3/2013 | Hinderthur et al. | 398/79 |
| 8,452,173 B2* | 5/2013 | Hehmann et al. | 398/25 |
| 8,483,565 B2* | 7/2013 | Elbers et al. | 398/79 |
| 2002/0149821 A1* | 10/2002 | Aronson et al. | 359/152 |
| 2003/0020979 A1* | 1/2003 | Bell | 359/110 |
| 2005/0249468 A1* | 11/2005 | Aronson et al. | 385/92 |
| 2007/0280265 A1* | 12/2007 | Gerstel | 370/395.52 |
| 2008/0069564 A1* | 3/2008 | Bernard | 398/72 |
| 2009/0279888 A1* | 11/2009 | Butler et al. | 398/37 |
| 2009/0317073 A1* | 12/2009 | Hotchkiss et al. | 398/1 |
| 2010/0104285 A1* | 4/2010 | Shaffer et al. | 398/66 |
| 2010/0202777 A1* | 8/2010 | Liu et al. | 398/83 |
| 2011/0158642 A1* | 6/2011 | Barnard et al. | 398/25 |
| 2012/0219143 A1* | 8/2012 | Hehmann et al. | 379/243 |
| 2012/0328293 A1* | 12/2012 | Grobe et al. | 398/58 |
| 2013/0045013 A1* | 2/2013 | Schmuck et al. | 398/67 |
| 2013/0251364 A1* | 9/2013 | Pachnicke et al. | 398/32 |

* cited by examiner

Prior Art

Prior Art

Block diagram of a 100-Gbit Muxponder implemented in a Stratix V FPGA.
Altera Whitepaper "Enabling 100-Gbit OTN Muxponder Solutions on 28nm FPGAs. Apr 2010 V1.0 p4

CLIENT GROOMING INTERFACE

CROSS REFERENCE TO RELATED APPLICATIONS

This application is a continuation in part of co-pending application Ser. No. 13/490,314, titled "Remote Optical Demarcation Point", filed Jun. 6, 2012, which is incorporated by reference as if set forth in full herein.

TECHNICAL FIELD

The invention pertains to apparatus, systems and methods for controlling the entry of a single channel optical signal into an optical network to ensure that the optical signal is admitted to the network only if it conforms to required payload mapping and/or multiplexing properties.

BACKGROUND ART

Any single client node, such as a router or server, that requires peer to peer optical connections to more than a single network destination across a service provider's optical network either uses a separate client interface in a point to point connection with each corresponding destination client interface, or is interconnected in a chain where intermediate nodes relay information to subsequent destination nodes. For example, consider the case of 5 routers that require 10 Gbps Ethernet™ connections between each other, as in a full mesh topology, across a service provider's network. Each router contains 4 router ports; 1 port for connection to each of the other 4 routers. The 5 routers, each with 4 ports, connect to the network using a total of 20 sets of client side optics, which are typically broad spectrum optics here after referred to as "gray optics", and 20 pairs of fiber. At the ingress to the network 20 transponders are required, 4 for each router connected to the optical network. This equates to 20 sets of line side or WDM optics here after referred to simply as "WDM optics", and another set of 20 gray optics. The total cost of equipment in our example of 5 interconnected routers across a service provider's network comes to 40 sets of gray optics plus 20 sets of WDM optics with 20 fiber pairs connecting the router ports to the service provider's network.

SUMMARY OF INVENTION

Technical Problem

Figure 1A:
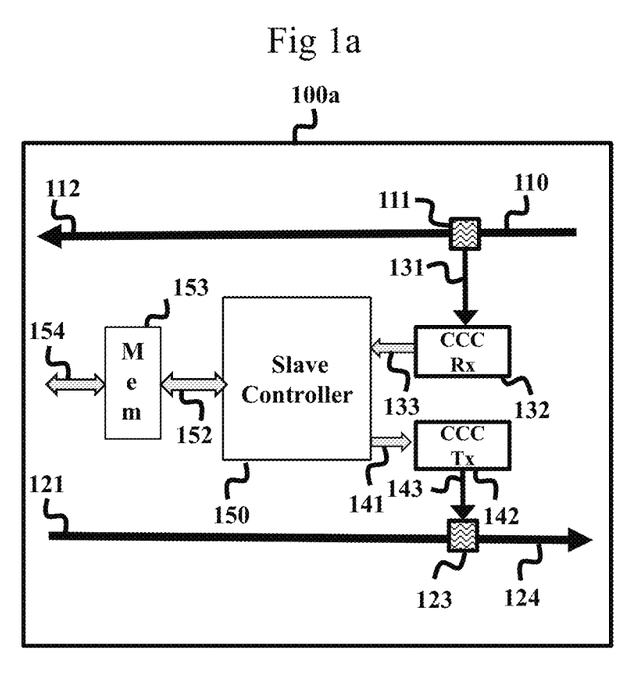
FIGS. 1a and 1b depict prior art examples of a Slave and Master, respectively, each capable of using a Customer demarcation Control Channel (CCC) to verify that key optical parameters of one or more optical data plane signals meet acceptance criteria defined by a service provider network before access of said signals to the network is allowed.
Figure 1B:
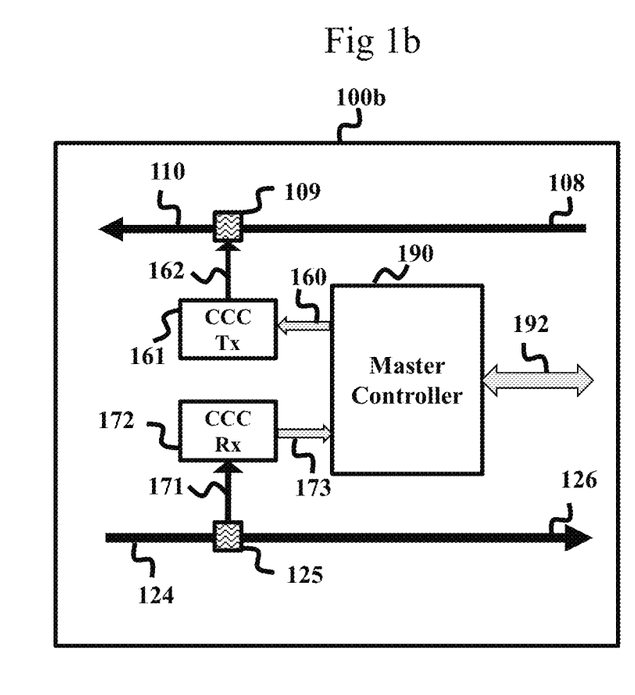

FIGS. 1a and 1b depict example embodiments of the two primary functional blocks associated with the Remote Optical Demarcation device of co-pending application Ser. No. 13/491,314; Slave 100a in FIG. 1a and Master 100b in FIG. 1b. The Master is located within the service provider's network while the Slave is located within the customer's node. The Slave is coupled to the client interface (not shown) on the customer side and is optically coupled to the Master on the network side. Fiber paths 110 and 124 couple the Master and Slave. The client interface provides customer data signals to the Slave for optical transmission across a service provider's network.

The remote optical demarcation point is limited by the set of functions under the control of the Slave/Master pair. In this particular case, the remote optical demarcation point corresponds to the left-most boundary of Slave 100a depicted in FIG. 1a. The customer side of the remote optical demarcation point is managed by the customer's network management system. The network side of the remote optical demarcation point—Slave 100a—is managed by the service provider's network management system.

The most basic function of the Master/Slave pair is to enable the service provider to verify that key optical parameters associated with the customer's signal meet the criteria of acceptance as defined by the service provider before access to the network is enabled. The Slave and the Master include logic for establishing a customer demarcation control channel (CCC) between each other such that those key parameters can be verified and/or controlled directly by the service provider management system.

For instance, Master CCC Transmitter 161 is optically coupled to Slave CCC Receiver 132 using fiber path 110 while Slave CCC Transmitter 142 is optically coupled to Master Receiver 172 using fiber path 124. Filters/couplers 109, 111, 123 and 124 are used to couple the CCC optical signal to the corresponding fiber paths allowing communications between Master Controller 190 and Slave controller 150. Master Controller 190 is also optionally coupled to path 192 providing communications with other service provider management entities such as NE, EMS or NMS controllers. Slave Controller 150 is also here coupled to memory 153 using path 152. Memory 153 is used to store and provide access to key information associated with the optical data plane signals conveyed through fibers 110 and 124. Memory 153 allows for an exchange of information between the client and service provider domains, which may or may not be used for verification purposes.

Figure 2:
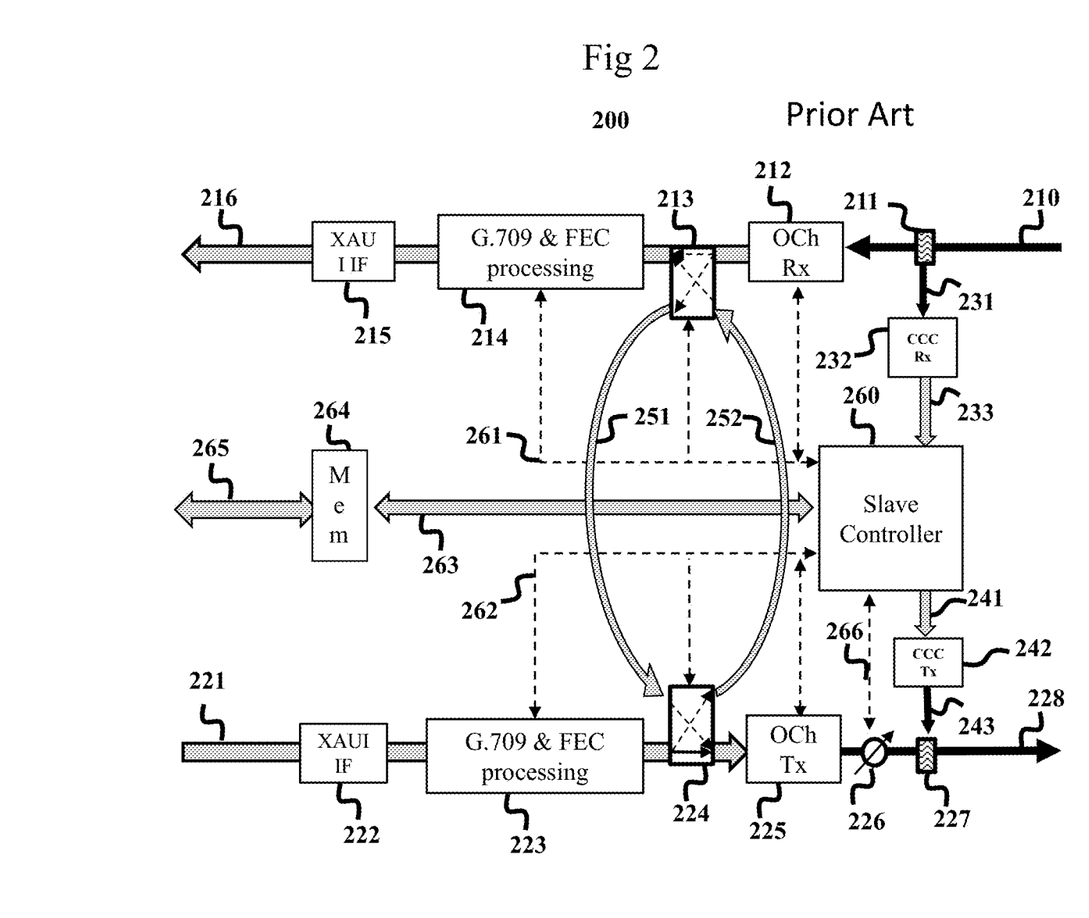
FIG. 2 depicts a prior art example of a Slave capable of controlling optical transceiver parameters, signal loop backs and a G.709 and FEC processing block.

FIG. 2, also from co-pending patent application Ser. No. 13/490,314, depicts another example of a Slave 200 depicting optional functions and control paths under the control of the service provider. For instance, control paths 261 and 262 enable the Slave, under the direction of the service provider, to control receiver 212, transmitter 225, switches 213 and 224, and receive and transmit G.709 & FEC processing blocks 214 and 223. In this embodiment, VOA 226 is also controlled by the Slave controller using control path 266 to prevent an optical signal that does not meet the acceptance criteria defined by the service provider from entering the network. In this particular example, the remote demarcation point can be pictured as a vertical line crossing the XAUI electrical interfaces 216 and 221 as well as optional path 265. The service provider network management system controls all functions to the network side of the XAUI interface while the client management system controls the functions on the client side of the XAUI interface.

Figure 3:
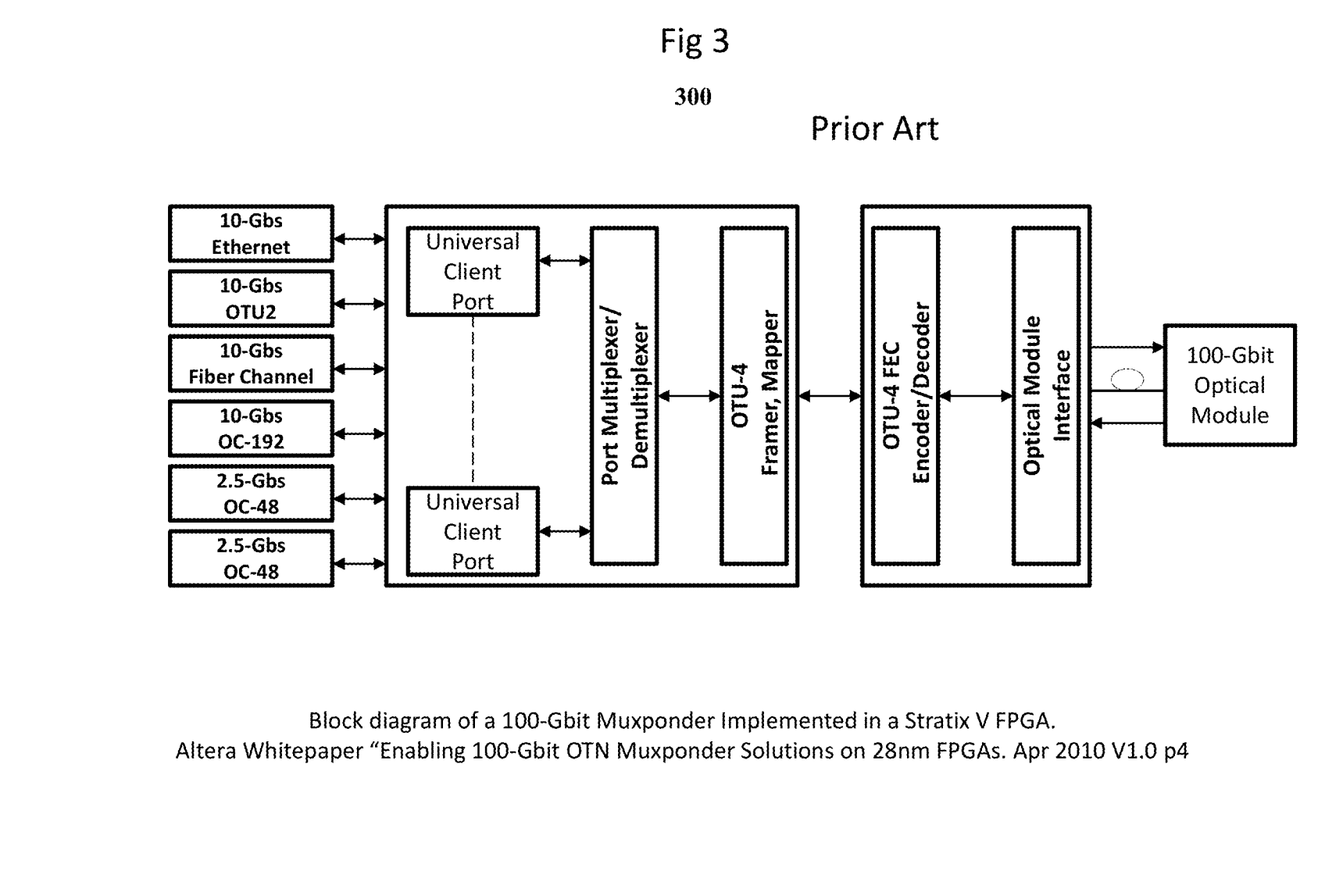
FIG. 3 depicts a prior art example of a 100-Gbit Muxponder connected to multiple client ports each carrying a possibly different respective service type such that the muxponder is capable of aggregating the client data streams into a single channel multiplexed OTU4 signal that is optically conveyed across a service provider's network.

The prior art depicted in FIG. 3 is from Altera Whitepaper, "*Enabling 100-Gbit OTN Muxponder Solutions on 28-nm FPGAs*", April 2010. This diagram shows multiple client interfaces, each carrying a different service type, as optically connected to Universal Client ports on the client side of a muxponder. The muxponder contains a port multiplexer, mapper, framer and FEC coding block connected to a 100-Gbit optical interface on the network side of the muxponder. The muxponder aggregates the different client signals into a single channel multiplexed signal such that an OTN switch fabric within the service provider's network is capable of routing each independent client data stream to a different destination. Although not described in this particular example, the traditional optical demarcation points are between each client interface and the corresponding Universal Client port of the muxponder. Given our example of 5 routers connected in a mesh topology, the use of muxponders instead of transponders still requires a total of 40 gray optics and 20 fiber pairs connecting each router port to a respective muxponder port, as well as 10 WDM optics connecting each muxponder to a respective port on the OTN switch.

Since many client nodes connect to a service provider network with more than a single client interface, significant cost savings can be achieved if multiple independent client data streams were capable of being aggregated into a single multiplexed channel that can be switched based upon the multiplexing structure within the service provider's network. The destination may or may not have a Master or a Slave at the interface. At issue is how to integrate the functions associated with the Remote Optical Demarcation Point with the functions of a muxponder such that multiple independent client data streams can be mapped and multiplexed within an optical data plane channel that can subsequently be switched in the service provider's network thereby reducing the need for a transponder or muxponder in the network. A Slave capable of performing such a function would constitute a client grooming interface within customer equipment.

Solution to Problem

The inventive apparatus, systems and methods allow a single client interface capable of transmitting multiple data streams in a single channel to establish communication paths to multiple destinations over an optical transport network capable of switching such data streams.

An objective of the present invention is to provide apparatus, systems and methods which allow a Slave to map and multiplex multiple data plane signals between one or more optical data plane signals.

A further objective of the present invention is to provide apparatus and systems which map and multiplex one or more data plane signals as one or more optical channel data units within an optical channel transport unit, in accordance with ITU-T Recommendation G.709, wherein said optical channel transport unit is conveyed as one or more optical data plane signals.

A further objective of the present invention is to provide a system which allows a Slave to convey a G.709 compliant signal containing one or more optical channel data units to a switch within a service provider's network which switches the optical channel data units.

A further objective of the present invention is to provide an apparatus and system that allows a service provider management domain to control the configuration of the physical layer interface coupling a Slave and the source of the client's data streams, said configuration including one or more of the data coding, framing, timing/synchronization, scrambling or the partitioning of the electrical lanes of said interface.

A further objective of the current invention is to provide apparatus and systems which enables a customer domain to request a change to the configuration and/or routing of the customer's data plane signals within a service provider's domain when said data plane signals are mapped and/or multiplexed within one or more optical data plane signals within said service provider's domain.

A further objective of the current invention is to provide apparatus, systems and methods which allow a service provider to control the acceptance of one or more optical data plane signals into the service provider's network based upon at least one optical signal property and at least one of a signal mapping and/or a signal multiplexing property of the optical data plane signals.

As may be apparent from the embodiments disclosed herein, the invention offers several advantages over the prior art. Further, the inventive apparatus, systems and methods are not limited to the specific embodiments described herein.

Other advantages may also be apparent, especially in certain specific cases where the invention may offer further advantages over the prior art.

Advantageous Effects of Invention

Significant savings are possible by consolidating the Slave apparatus, the Master apparatus and system function as defined in patent application Ser. No. 13/429,314 with an interface capable of providing a multiplexed signal and information corresponding to the mapping and multiplexing structure of the signal such that the Slave/Master pair, working in conjunction with the service provider's management system, can at least verify that optical data plane signals are properly configured before they are granted access to the network.

Using the example above, the total amount of hardware needed for full mesh connectivity between 5 routers over a service provider's optical network can be reduced to 5 router ports (1 for each router @4 times the original rate), 5 fiber pairs (1 for each router port), 0 gray optics, 1 OTN switch and 10 WDM optics (1 for each router port and 1 for each OTN switch port). The savings include cost of equipment, including equipment sparing, cost of power consumption and cost of cooling, as well as operational cost savings due to the management of fewer devices and the ability to remotely control the devices at the router ports.

DESCRIPTION OF EMBODIMENTS

Those skilled in the art will appreciate that various changes and modifications may be made to the embodiments without departing from the spirit or scope of the invention. It is intended that such changes and modifications be included within the scope of the invention. Further, it is intended that the invention not be limited to the embodiments described herein, nor to those changes and modifications apparent as of the filing date of this application. It is intended that the invention be limited in scope only by the appended claims.

Figure 4:
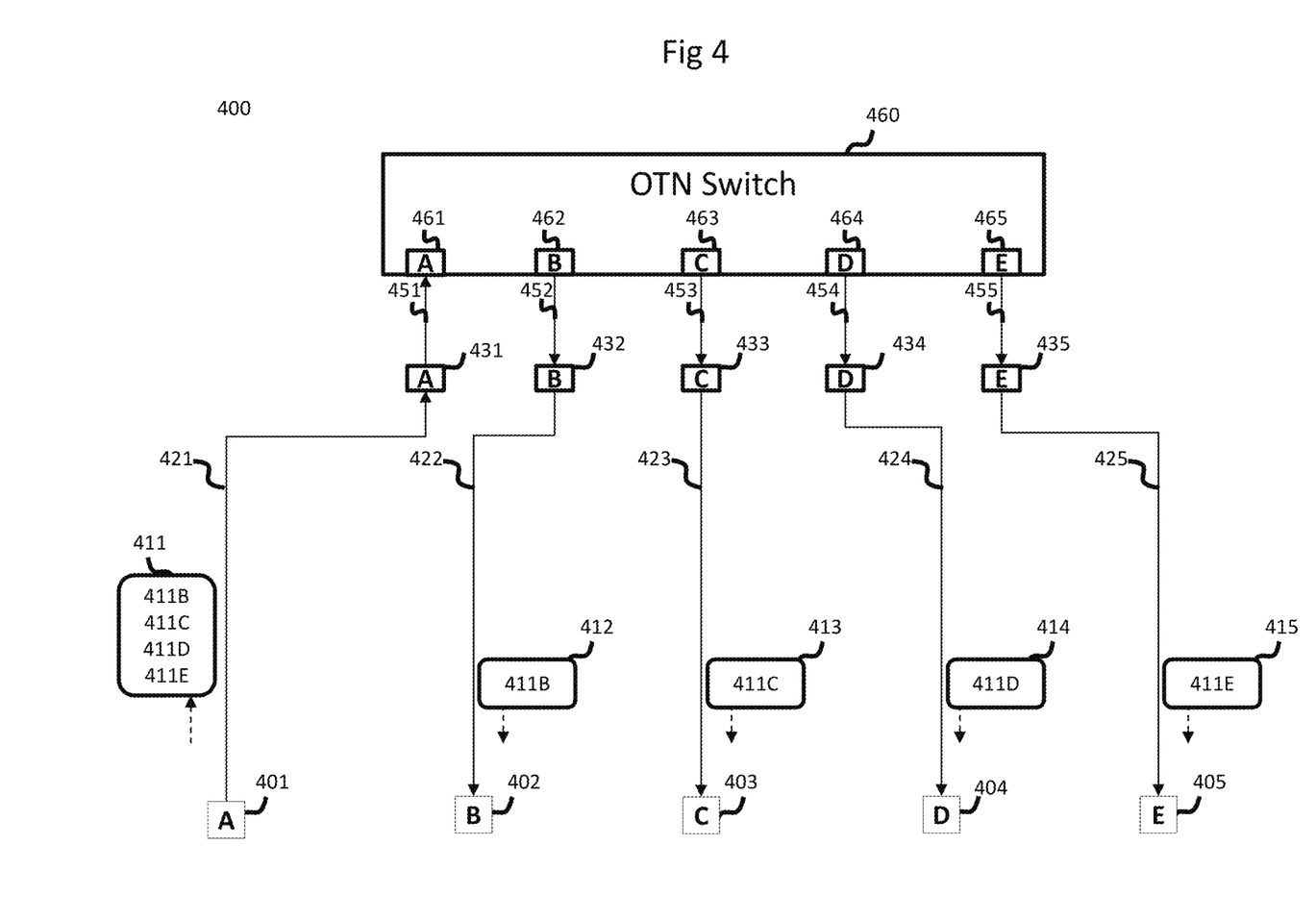
FIG. 4 depicts an example system consistent with the invention where 5 Slaves are interconnected via an OTN switch, allowing 4 data streams multiplexed within a channel from one Slave to be switched and sent, one to each of the respective 4 other Slaves.

FIG. 4 depicts a network configuration describing optical signal flows from a single source interface capable of transmitting multiple independent client data streams in a single optical multiplexed channel to multiple destination interfaces over an optical network. Although not described in this embodiment, the Master/Slave ports may use the CCC to verify one or more of the optical parameters associated with the optical data plane signals, as well as one or more of G.709 compliance with multiplexing, mapping and framing structures, FEC algorithm selection, and client data stream service type, rate, physical layer coding and electrical lane partitioning. It should be noted that identification information such as source layer 2 and 3 addresses associated with the client interface may be done after the channel has been connected and the client node has run discovery protocols to identify source/destination pair information. The source/destination pair information can be useful to the service provider in cases where the host dynamically requests source/destination pair reconfigurations. Such a function is still consistent with the invention.

Slaves 401-405, each within a client node, are coupled to corresponding Master ports 431-435, each at an ingress node of the service provider's network, using fiber paths 421-425. Optical data plane signal 411 is sourced at Slave 401 as a 40 Gbps Optical Channel Transport Unit (OTU3) single channel multiplexed signal composed of four 10 Gbps Optical Channel Data Units (ODU2s) labeled 411B through 411E. Optical data plane signal 411 is conveyed along fiber path 421 to Master port 431. Master port 431 optically passes optical data plane signal 411 along fiber path 451 to OTN Switch 460 at switch port 461. OTN Switch 460 is configured to optically terminate and demultiplex optical data plane signal 411 down to the ODU2 level structure within the OTU3 such that 411B is directed to output switch port 462, 411C is directed to output switch port 463, 411D is directed to output switch port 464 and 411E is directed to output switch port 465. Switch output ports 462-465 optically convey optical data plane signals 412-415 each containing their respective switched ODU2s within 10 Gbps OTU2 signals to Master ports 432-435 along fiber paths 452-455. Master ports 432-435 optically pass the corresponding optical data plane signals 412-415 using fiber paths 422-425 for delivery to destination client interfaces coupled to Slaves 402-405.

Although Slave 401 is discussed as transmitting only a single channel, Slaves that support more than a single channel also fall within the scope of the invention. It should be noted that Slaves are not required to have WDM optics; gray optics can also be used. Although the location of the Master ports are described as being located at each corresponding ingress node of the service provider's network, any one or more of the Master ports could be integrated directly into the OTN Switch port, or anywhere between the ingress node or OTN switch port. Integration at the OTN switch port has the advantage of remotely managing the corresponding Slave directly from the Master port at the OTN switch, enabling reconfiguration of both the Slave and the OTN switch to be implemented using a common controller.

The client nodes and the OTN switch may be co-located or they may be distributed across multiple locations with intervening optical components or systems such as optical multiplexers, ROADMs and optical amplifiers. In FIG. 4 such intervening equipment has been omitted for the sake of clarity.

Figure 5:
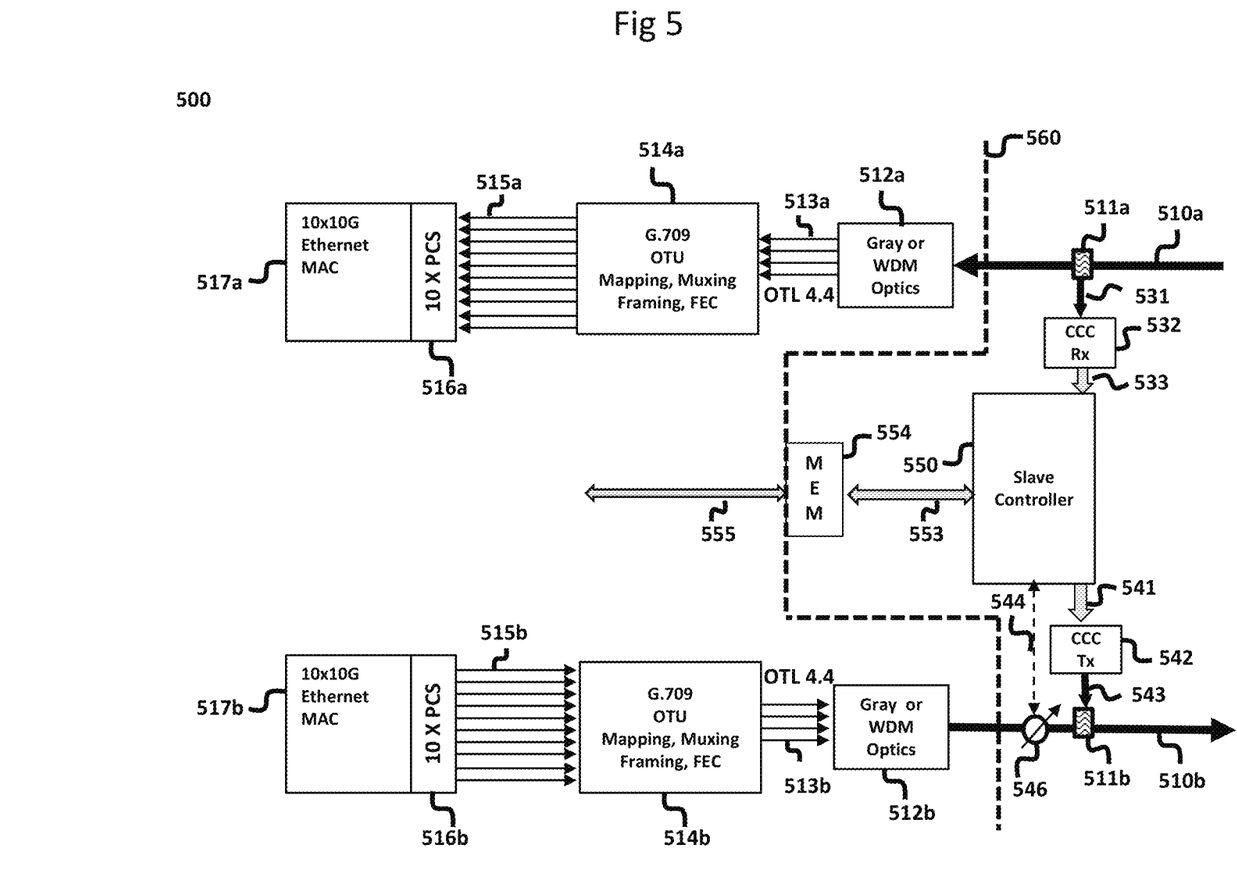
FIG. 5 depicts an inventive Slave apparatus wherein 10×10 Gbps Ethernet™ client data plane signals are mapped and multiplexed between a G.709 compliant OTU4 signal which is then converted between an optical data plane signal conveyed between the client equipment and the Slave.

FIG. 5 depicts a client interface capable of mapping and multiplexing 10×10 Gbps Ethernet™ data streams for transmission as one or more optical data plane signals within a service provider's network. Remote Optical Demarcation Point 560 highlights the boundary of a Slave that is under the control of the service provider management system. The host may directly configure MACs 517a and 517b, the Reconciliation/Physical Coding subsystem layers 516a and 516b, the allocation of electrical lanes 515a and 515b, the G.709 blocks 514a and 514b performing mapping, multiplexing, framing and FEC OH processing, as well as the electro-optical conversion blocks 512a and 512b. In this particular embodiment, the host stores the configuration information, including values describing the mapping, multiplexing and optical parameters, in memory 554 using an I2C interface 555. The service provider management system uses the CCC to verify the acceptability of the configuration information in memory 554 before allowing the optical signal into their network. VOA 546 blocks the optical data plane signal until notified by the service provider management system that the signal meets the acceptance criteria.

The service provider management system sends a message from a Master to the Slave requesting configuration information stored in memory 554. The CCC carrying the message is received on fiber 510a and filtered for delivery on fiber path 531 using filter 511a. The CCC Receiver 532 converts the CCC optical signal to an electrical signal for transmission to Slave Controller 550 using electrical path 533. Slave controller 550 reads the configuration information from memory 554 using electrical path 553. Slave controller 550 sends a response containing the configuration information to the service provider management domain for verification. The client need only provide information deemed adequate by the service provider for verification. In some cases, a single code or a component's manufacturing data may be sufficient to enable the service provider to verify that the optical data plane signal is compliant to the service provider's acceptance criteria.

The transmission path from the client interface to the network in this embodiment starts at the 10×10 Gbps Ethernet™ MAC block 517b. Each MAC is capable of transmitting one 10 Gbps client data stream by transmitting an Ethernet™ formed packet to a corresponding Reconciliation/Physical Coding Sub-layer 516b for rate adjustment and 64 B/66 B physical layer encoding. The output of each PCS is coupled to a single lane of electrical lanes 515b for transmission to the G.709 Mapping, Multiplexing, Framing and FEC block 514b. The G.709 block is configured to treat each lane as an independent client signal which is then mapped and multiplexed to create a single multiplexed OTU4 signal containing 10 ODU2s. The ODU2s are mapped within an ODTU group within the OPU4 transported by the OTU4. The OTU4 is framed and encoded with Forward Error Correction codes before being transmitted electrically over 4×28 Gbps OTL 4.4 electrical lanes 513b. Gray or WDM optics 512b receives the OTL4.4 electrical lanes and performs electrical to optical conversion. The optical signal from Gray or WDM optics 512b is blocked by VOA 546 until the service provider has verified the acceptability of the optical data plane signal passing there through. The receive path is the reverse of the transmit path.

Figure 6:
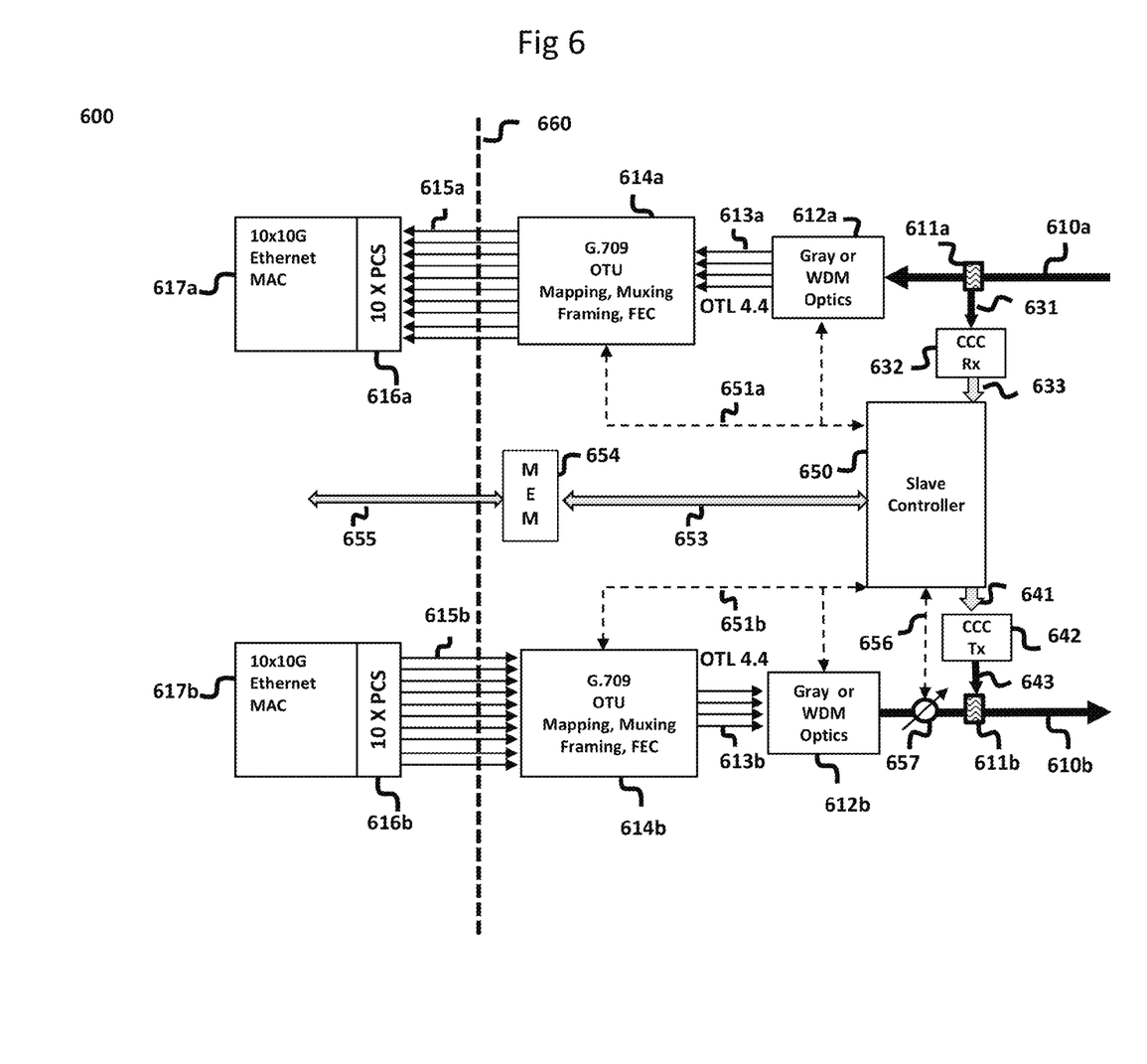
FIG. 6 shows an inventive Slave apparatus that includes a G.709 block remotely configured by the service provider management domain to create a single channel multiplexed signal carrying 10×10 Gbps Ethernet™ data streams. The demarcation point is on the client side of the G.709 block.

FIG. 6 shows a Slave configuration with demarcation point 660 between G.709 blocks 614a and 614b and the PCS blocks 616a and 616b. In this embodiment, the host controls up to 10 Ethernet™ MACs with corresponding PCS layers. The host here determines the PCS blocks 616a and 616b configuration of electrical lanes 615a and 615b, including their mapping to the corresponding MACs. Slave controller 650 controls Gray or WDM optics 612a and 612b and G.709 blocks 614a and 614b using control paths 651a and 651b. When electrical lane mapping is controlled by the host, the host will assign a particular lane to each MAC and load the configuration of lanes to MACs inside memory 554 using I²C interface 655. The service provider management domain will verify the mapping in memory 554 provided by the host system and configure G.709 blocks 614a and 614b with the correct mapping and multiplexing configuration, along with framing as well as FEC algorithm, to match the partitioning of electrical lanes 615a and 615b. Optionally, if the service provider management domain determines that the host system configuration violates the service provider's acceptance criteria, Slave controller 650 may store an indication of this condition in memory 654 via path 653, and this indication may further be made accessible to the host system via I²C interface 655.

Figure 7:
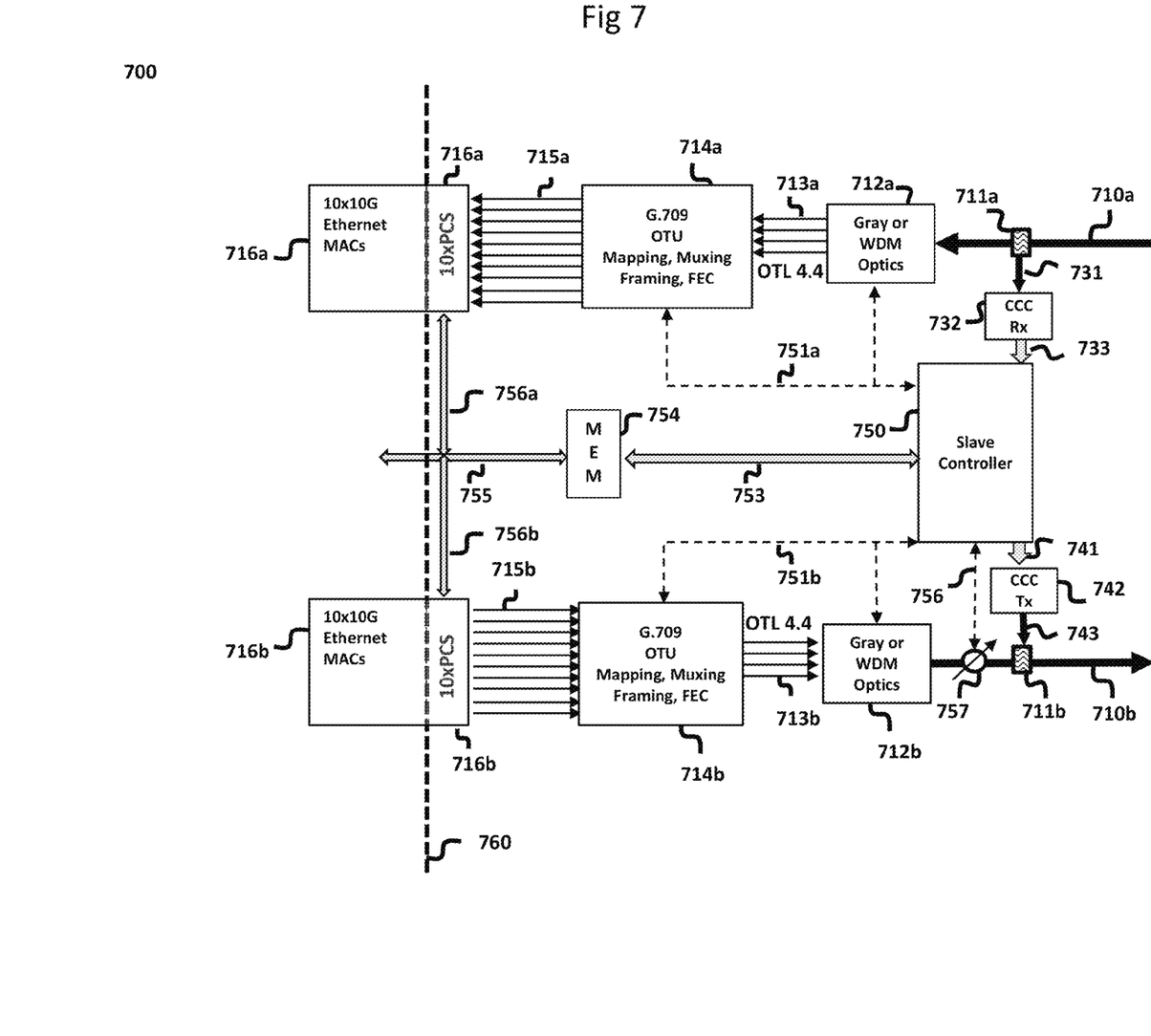
FIG. 7 shows an inventive Slave apparatus that includes a G.709 block remotely configured by the service provider management domain to create a single channel multiplexed signal carrying 10×10 Gbps Ethernet™ data streams. The demarcation point is on the client side of the physical layer interface coupled to the MAC block.

FIG. 7 shows a Slave configuration where the remote demarcation point is between the MAC and PCS layers. The service provider management domain controls PCS layers 716a and 716b, the assignment of lanes 715a and 715b, G.709 blocks 714a and 714b, OTL 4.4 lanes 713a and 713b, and Gray or WDM optics 712a and 712b. PCS layers 716a and 716b are controlled by the service provider using the control path 756a and 756b, which may employ an underlying structure such as an I²C bus in a shared manner through appropriate means such as by using multiple master operation. In this particular embodiment, memory 754 would be designed to operate as an I²C master on interface 755. The Slave controller 750 will load configuration parameters into memory 754. The mapping between the MAC and PCS layers may be confirmed by the service provider before it will accept the client data streams for transmission across their network.

Figure 8:
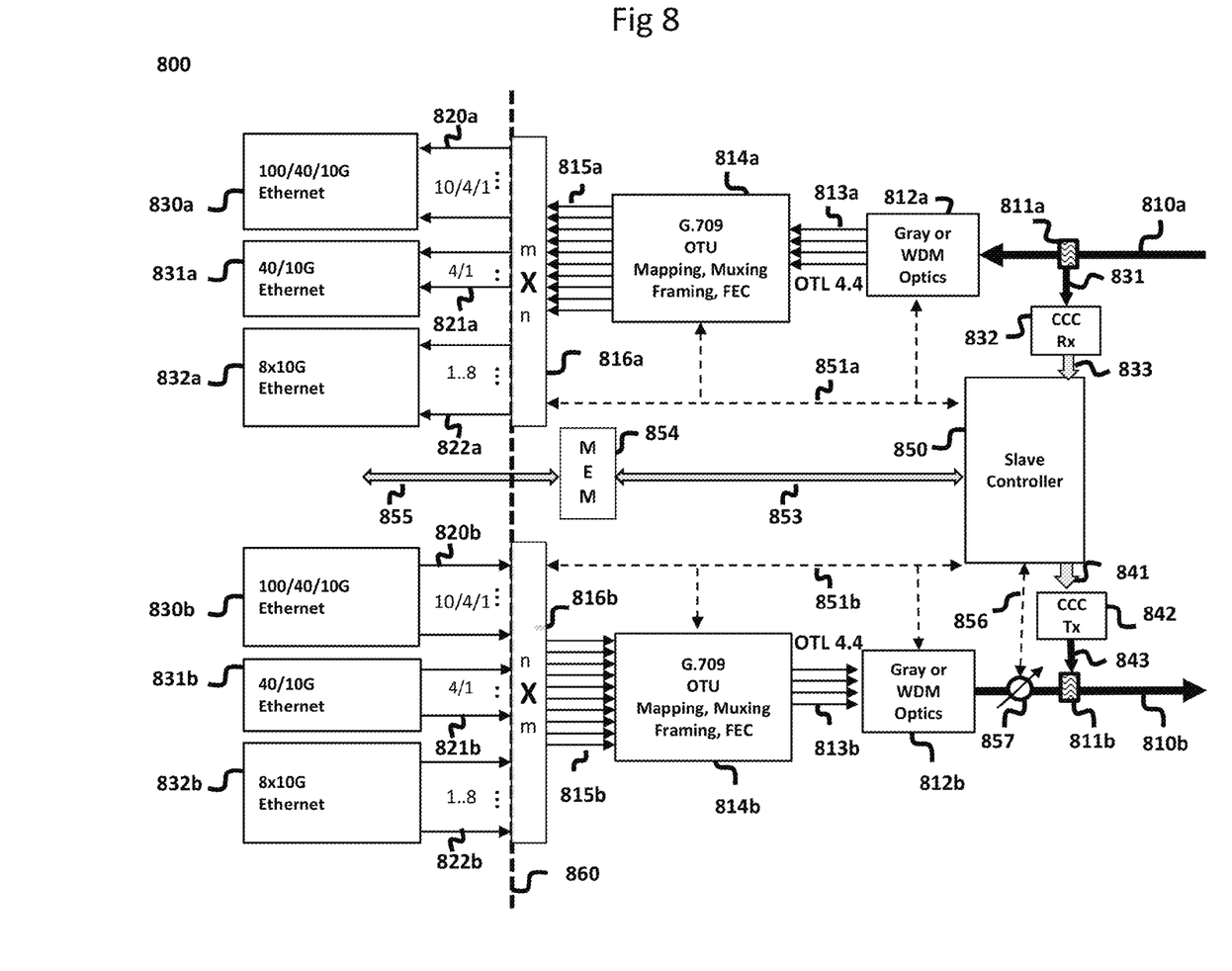
FIG. 8 shows an inventive Slave apparatus similar to that of FIG. 7 capable of conveying one or more data streams, possibly of different rates, via a single channel multiplexed signal whereby the set of one or more data streams mapped and multiplexed by the Slave can be configured by the service provider management domain.

FIG. 8 shows a flexible 100 Gbps client interface where the remote demarcation point is located at the client side of (m×n) cross connects 816a and 816b. This embodiment supports multiple physical layers between devices within the host system and G.709 blocks 814a and 814b, some that are capable of running at different rates. For instance Ethernet™ blocks 830a and 830b are capable of operating at 100 Gbps, 40 Gbps or 10 Gbps, which correspond to 10, 4 or 1×10 Gbps electrical lane(s) 820a and 820b.

Cross connects 816a and 816b are configured to connect the n of the m lanes 820a, 821a, 822a, 820b, 821b and 822b required by the configuration of Ethernet™ blocks 830a, 831a, 832a, 830b, 831b and 832b so that they are connected to the correct respective electrical lanes 815a and 815b. For example, electrical lanes 815a and 815b may be configured to operate as a single CAUI interface connected to lanes 820a and 820b if Ethernet™ blocks 830a and 830b are configured to operate as a 100 Gbps Ethernet™ port. Alternatively, if Ethernet™ blocks 830a, 830b 831a and 831b are configured to operate as 40 Gbps Ethernet™ ports while Ethernet™ blocks 832a and 832b are configured to operate as 2×10 Gbps Ethernet™ ports, cross connects 816a and 816b may be configured to connect the 4 active lanes of 820a and 820b to the first 4 lanes of 815a and 815b, the 4 active lanes of 821a and 821b to the 6$^{th}$ through 9$^{th}$ lanes of 815a and 815b, and the 2 active lanes of 822a and 822b to the 5$^{th}$ and 10$^{th}$ lanes of 815a and 815b, causing electrical lanes 815a and 815b to operate as 2×XLAUI and 2×XFI interfaces.

The configuration of the lanes on either side of cross connects 816a and 816b may optionally be stored in memory 854 using paths 855 for the host and 854 for the Slave. If the host stores such information in memory 854, the service provider management domain may verify that the host configuration is consistent with the configuration of the Slave, while if the Slave makes such information available to the host via memory 854, the host may likewise verify whether its configuration matches that of the service provider. This allows the host and the service provider domains to verify the correctness of the configuration on both side of the demarcation point before the optical data plane signal is allowed access to the service provider's network.

Figure 9:
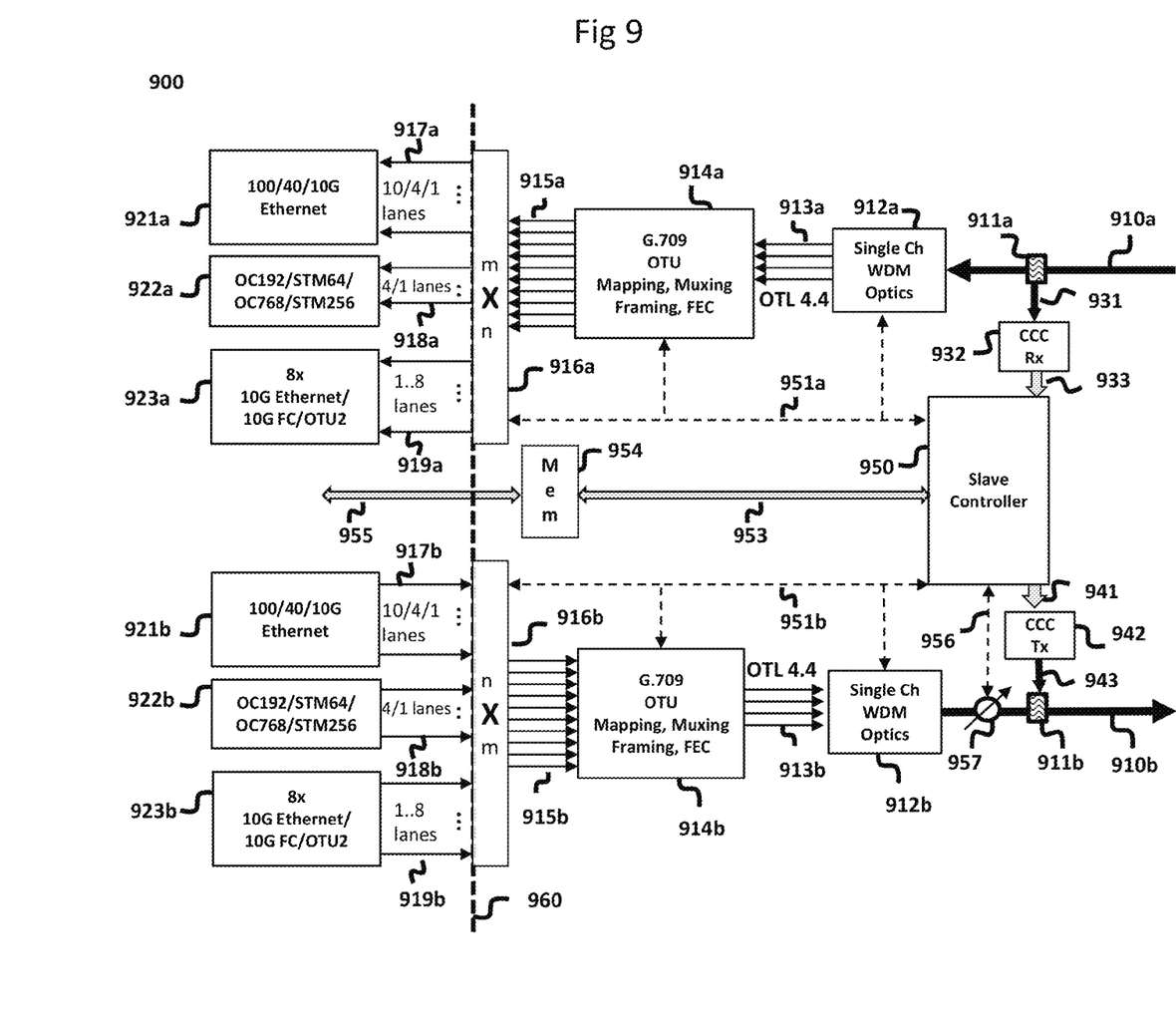
FIG. 9 shows an inventive Slave apparatus similar to that of FIG. 8 capable of conveying one or more client data streams, possibly of different signal types and rates, via a single channel multiplexed signal whereby the set of one or more data streams mapped and multiplexed by the Slave can be configured by the service provider management domain.

FIG. 9 shows a flexible 100 Gbps interface where the remote demarcation point is located at the client side of (m×n) cross connects 916a and 916b. This embodiment supports multiple service types within the host system. Some service types may require a different clock rate. For instance Ethernet™ blocks 921a and 921b operate using 100 Gbps, 40 Gbps or 10 Gbps, which more precisely correspond to 10, 4 or 1×10.3125 Gbps electrical lane(s) 917a and 917b. OC-192/STM64 or OC-768/STM256 SONET/SDH blocks 922a and 922b are capable of operating with 1 or 4×9.953 Gbps electrical lanes 918a and 918b, respectively. A 10 G Ethernet block, a 10 G Fiber Channel block and an OTU2 block more precisely correspond to 10.3125 Gbps, 10.518 Gbps and 10.709 Gbps electrical lanes 919a and 919b, respectively. As in FIG. 8, the service provider's network management system verifies signal properties and clock rates associated with each service type and optionally confirms them with the host management system.

A preferred embodiment to support multiple clock rates is to use a single clock source coupled to a PLL associated with each service block such that a scaling circuit is configured to match the rate associated with a given service type. This function applies to electrical lanes 917a, 918a, 919a, 917b, 918b, 919b as well as the corresponding lanes 915a and 915b. An alternative solution is to provide multiple clock sources such that a selector circuit for each service block can be configured to choose the correct clock source.

Cross connects 916a and 916b are configured to connect n of the m lanes 917a, 918a, 919a, 917b, 918b and 919b required by the different service type blocks 921a, 922a, 923a, 921b, 922b and 923b to the correct respective members of electrical lanes 915a and 915b.

Figure 10:
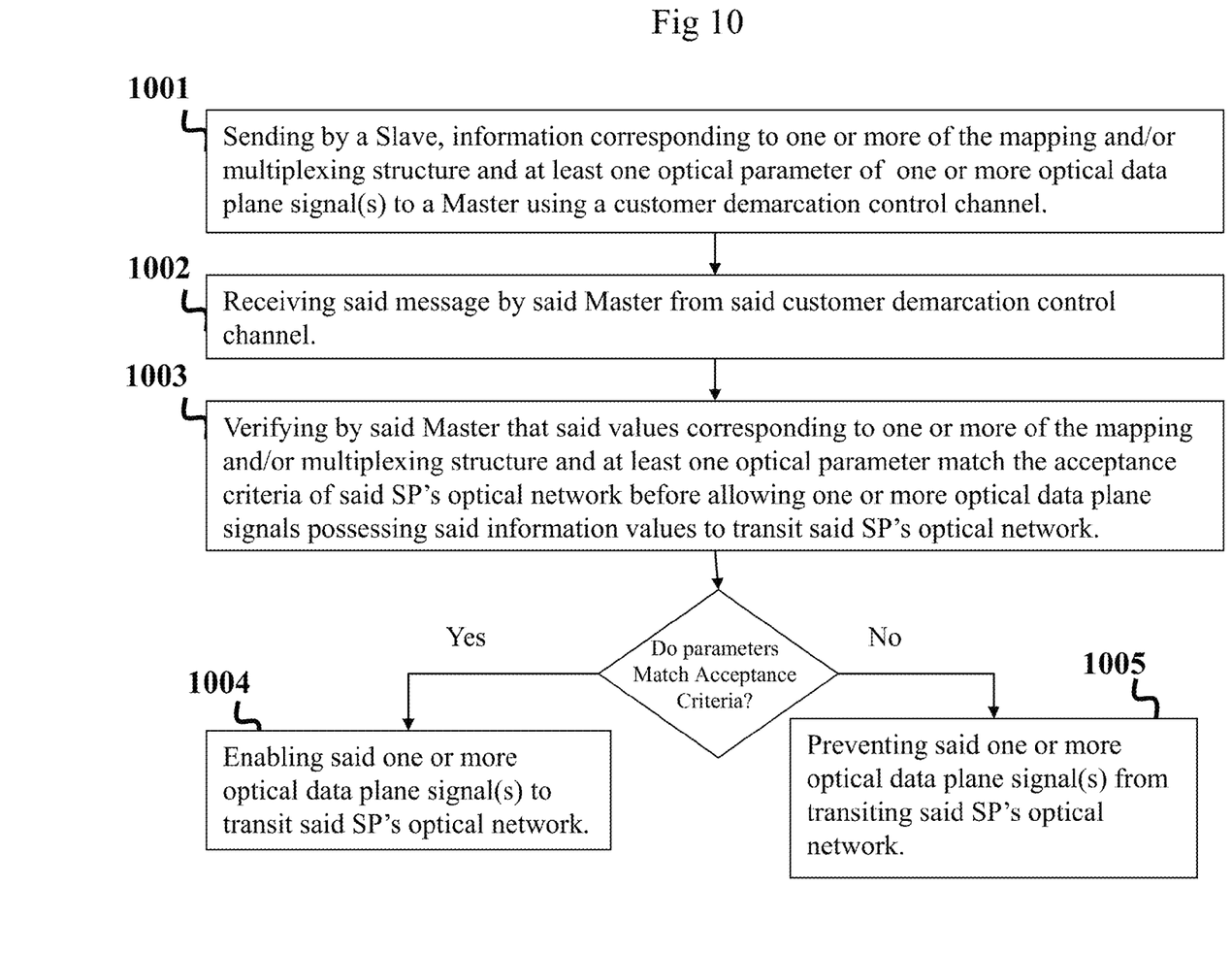
FIG. 10 shows an example method for verifying information corresponding to the mapping and multiplexing structure and at least one optical parameter associated with at least one optical data plane signal originating at or within CPE equipment, wherein the inventive method determines whether or not the optical data plane signal meets the criteria of acceptance as defined by the service provider's network management system.

FIG. 10 depicts a flow chart describing a preferred method of verifying whether information corresponding to one or more of the mapping and multiplexing structure and at least one optical parameter value associated with one or more optical data plane signals conveyed by a Slave meets the acceptance criteria defined by the SP when verification is performed by a Master.

Before access to at least a portion of the SP's network is granted, one or more optical data plane signals are blocked either at the Slave in the direction of the SP's network or by the Master in the direction away from the Slave. Only after the information corresponding to one or more of the mapping and multiplexing structure and at least one optical parameter values associated with one or more optical data plane signals have been verified according to criteria defined by the SP will access be granted and the optical data plane signals allowed to pass beyond the point at which the signals may be blocked.

In step 1001 the Slave sends a message containing information corresponding to one or more of the mapping and multiplexing and at least one optical parameter value associated with one or more optical data plane signals to the Master, which is received by said Master in step 1002. The information values may already be known to the Slave, or it may, prior to sending them, retrieve them if necessary. In step 1003 the Master controller verifies that the information values match the acceptance criteria defined by the SP. If the information values match the acceptance criteria defined by the SP, then at step 1004 access is enabled and, optionally, a message conveying 'criteria met, access enabled' may be sent by the Master to the Slave. Enabling access to the network may be accomplished by controlling the output from the Slave once the acceptance message from the Master has been received, or by controlling the output of the Master in the direction away from the Slave, or by a combination thereof. If the information values do not match the acceptance criteria defined by the SP, then at step 1005 the Master prevents access of the optical data plane signals into at least a portion of the SP's network and may, optionally, send a message to the Slave module conveying 'criteria not met, access denied'.

A variation of the method disclosed in FIG. 10 includes a modification of step 1001 such that the Slave controller sends an unsolicited periodic message containing information corresponding to one or more of the mapping and multiplexing structure and at least one optical parameter values associated with one or more optical data plane signals, via the CCC to the Master. Another variation includes sending the information values in response to a request from the Master.

Figure 11:
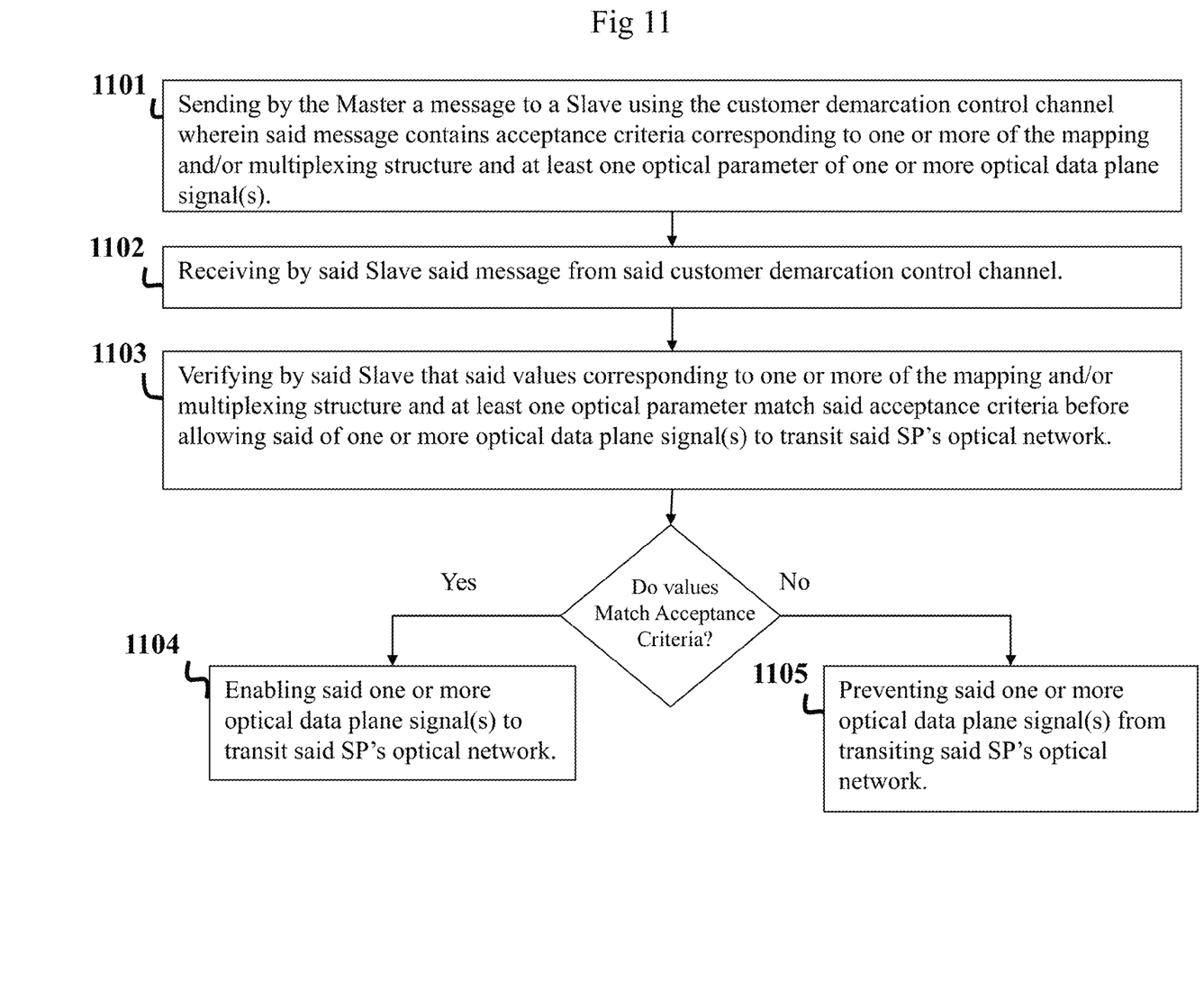
FIG. 11 shows a further example method for verifying information corresponding to the mapping and multiplexing structure and at least one optical parameter associated with at least one optical data plane signal originating at the CPE equipment location, wherein the inventive method determines at the Slave location whether or not the optical data plane signal(s) meets the criteria of acceptance as defined by the service provider's network management system.

An alternate preferred method of verifying whether the information corresponding to one or more of the mapping and multiplexing structure and at least one optical parameter value associated with one or more optical data plane signals associated with a Slave meet the acceptance criteria defined by the SP, wherein the verification is performed at the Slave, is depicted in FIG. 11. In this method, the Master sends the acceptance criteria for the information corresponding to one or more of the mapping and multiplexing structure and at least one optical parameter value associated with one or more optical data plane signals to the Slave via the CCC in Step 1101. In Step 1102, the Slave receives said acceptance criteria sent by the Master from the CCC. In Step 1103, the Slave verifies the corresponding optical data plane signal parameter values against said acceptance criteria to determine whether or not said optical data plane signal(s) should be allowed access to at least a portion of the SP's network. The optical data plane signal parameter values may already be known to the Slave, or it may first retrieve them if necessary. If the determination is that said access is allowed, Step 1004 enables such access, otherwise such access is prevented at Step 1105. The allowance or prevention of the optical data plane signals transit of at least a portion of the SP's domain may be performed at the Slave, after which the Slave may inform the Master of the allowance or prevention, or the Slave may inform the Master of said determination and the Master may perform the allowance or prevention, or both the Master and the Slave may perform all or portions of the allowance or prevention.

Those skilled in the art will appreciate that various changes and modifications may be made to the embodiments without departing from the spirit or scope of the invention. It is intended that such changes and modifications be included within the scope of the invention. By way of non-limiting example, while the invention has been described in embodiments compliant to the OTN mapping and time-division multiplexing methods of ITU-T Recommendation G.709, one skilled in the art will recognize that similar mapping and multiplexing methods such as those defined in SONET and SDH related specifications are equally applicable, and are intended to be covered by the appended claims. Likewise, similar electrical signal mapping and multiplexing methods either currently under development or to be developed within the term of this patent are also intended to be covered by the claims. In addition, it is possible that the mapping and multiplexing elements of the invention may be applied in one or more sequential or parallel stages, such as when multiple signals are mapped and multiplexed into an ODTU group within a low order OPU, which is subsequently multiplexed within a higher order OPU. Further, it is intended that the invention not be limited to the embodiments described herein, nor to those changes and modifications apparent as of the filing date of this application. It is intended that the invention be limited in scope only by the appended claims.

We claim:

1. In an optical network connecting a customer's network element in a customer's network with a service provider's network element in a service provider's network, a customer optical interface apparatus comprising:

a first customer interface within said customer's network element for optically conveying one or more optical data plane signals to a provider interface within said service provider's network element;

a customer controller within said customer's network element coupled to a provider controller within said service provider's network, wherein said customer controller and said provider controller are managed within said service provider's network, and wherein said customer's network element is managed at least in part, but not entirely, within said customer's network; and a customer demarcation control channel for conveying, between said customer controller and said provider controller, information of at least one of a payload signal mapping property and/or a signal multiplexing property of said one or more optical data plane signals, and wherein said provider controller is configured to enable and to prohibit the transmission of said one or more optical data plane signals in accordance with said information, and wherein said control channel is not demodulated with said one or more optical data plane signals at said provider controller.

2. The apparatus of claim 1, further comprising:
a second customer interface coupling one or more data plane signals to a signal processing block mapping and/or multiplexing said one or more data plane signals between said one or more optical data plane signals, said signal processing block further coupled to said first customer interface.

3. The apparatus of claim 2, wherein:
said signal processing block maps one or more of said data plane signals between the payload within one or more optical channel data units within an optical channel transport unit, in compliance with the mapping and/or multiplexing requirements of ITU-T Recommendation G.709, wherein said optical channel transport unit is conveyed as said one or more optical data plane signals.

4. The apparatus of claim 3, further comprising:
an optical data plane signal transmitter electrically coupled to said signal processing block and optically coupled to said first customer interface, said transmitter further coupled to said customer controller, wherein said transmitter conveys said optical channel transport unit, after conversion to an optical signal format, as said one or more optical data plane signals to said first customer interface.

5. The apparatus of claim 3, further comprising:
said customer controller coupled to said signal processing block, wherein said customer controller controls mapping and/or multiplexing operations performed by said signal processing block.

6. The apparatus of claim 5, further comprising:
one or more physical layer devices coupled to said signal processing block via said second customer interface for conveying said one or more data plane signals there between, wherein said customer controller determines whether configurable attributes of said signal processing block are configured in a manner consistent with said one or more physical layer devices, said configurable attributes including at least one of data coding, framing, timing or synchronization, or scrambling of at least one physical layer signal or the signal type of at least one of said one or more data signals.

7. The apparatus of claim 6, wherein:
said customer controller configures said configurable attributes at said signal processing block.

8. The apparatus of claim 6, wherein:
said signal processing block is configured to operate in one of at least two modes, each of said modes corresponding to a unique configuration of said configurable attributes.

9. The apparatus of claim 6, further comprising:
said customer controller coupled to said one or more physical layer devices, wherein said customer controller configures said one or more physical layer devices.

10. The apparatus of claim 3 further comprising:
a third interface coupled to said customer controller and to at least one customer domain controller, said customer domain controller controlled by said customer's network, said third interface for coupling configuration data there between in conformance with the boundaries of said customer's network and said service provider's network, wherein said configuration data includes information on attributes of said second customer interface from the perspective of either one or both of said customer controller and said customer domain controller, said attributes including at least one of data coding, framing, timing or synchronization, or scrambling of at least one physical layer signal of said second customer interface or the signal type of at least one of said one or more data signals.

11. The apparatus of claim 1 further comprising:
a second customer interface coupling one or more data plane signals to a signal processing block, said signal processing block operable in any one of two or more operating modes, wherein at least one of said operating modes causes said signal processing block to map and/or multiplex at least two of said data plane signals between said one or more optical data plane signals, said signal processing block further coupled to said first customer interface.

12. In an optical network connecting a customer's network element in a customer's network with a service provider's network element in a service provider's network, a provider optical interface apparatus comprising:
a provider interface within said service provider's network element coupled to a customer interface within said customer's network element, said customer interface for optically conveying one or more optical data plane signals to said provider interface;
a provider controller within said service provider's network coupled to a customer controller within said customer's network element, wherein said customer controller and said provider controller are managed within said service provider's network, and wherein said customer's network element is managed at least in part, but not entirely, within said customer's network; and
a customer demarcation control channel for conveying, between said customer controller and said provider controller, information of at least one of a payload signal mapping property and/or a signal multiplexing property of said one or more optical data plane signals, and wherein said provider controller is configured to enable and to prohibit the transmission of said one or more optical data plane signals in accordance with said information, and wherein said customer demarcation control channel is not demodulated with said one or more optical data plane signals at said provider controller.

13. In an optical network connecting a customer's network element within a customer's network with a service provider's network element in a service provider's network, a system for providing optical demarcation, comprising:
a provider interface within said service provider's network element;
a customer interface within said customer's network element optically coupled to said provider interface for optically conveying one or more optical data plane signals to said provider interface;
a provider controller within said service provider's network;
a customer controller within said customer's network element coupled to said provider controller, wherein said customer controller and said provider controller are managed within said service provider's network, and wherein said customer's network element is managed at least in part, but not entirely, within said customer's network; and
a customer demarcation control channel for conveying, between said customer controller and said provider controller, information of at least one of a payload signal mapping property and/or a signal multiplexing property of said one or more optical data plane signals, and wherein said provider controller is configured to enable and to prohibit the transmission of said one or more optical data plane signals in accordance with said information, and wherein said customer demarcation control channel is not demodulated with said one or more optical data plane signals at said provider controller.

14. The system of claim 13, wherein
one or more data signals are mapped between the payload within one or more optical channel data units within an optical channel transport unit, in compliance with the mapping and/or multiplexing requirements of ITU-T Recommendation G.709, and wherein said optical channel transport unit is conveyed as said one or more optical data plane signals, and further comprising;
at least one switch coupled to said provider interface for switching said optical channel data units.

15. A method for controlling transmission of at least one optical data plane signal sent from a customer optical interface within a customer's network element in a customer's network towards a provider optical interface within a service provider's network element in a service provider's network, the method comprising:
conveying information representing a value of at least one of a payload signal mapping and/or a signal multiplexing property associated with said at least one optical data plane signal, by,
sending said information from a customer controller at said customer's network element to a provider controller within said service provider's network via a customer demarcation control channel conveyed there between, wherein said customer's network element is at least partially, but not entirely, managed within said customer's network, and wherein said customer controller and said provider controller are both managed within said service provider's network, and
receiving said information said provider controller; and
enabling or prohibiting the transmission of said one or more optical data plane signals in accordance with said information, by,
verifying at said provider controller that said information is acceptable, and,
enabling said at least one optical data plane signal to transit at least a portion of said service provider's network if said information is acceptable, or prohibiting said at least one optical data plane signal from transiting at least a portion of said optical network if said information is not acceptable; and
wherein said control channel is not demodulated with said one or more optical data plane signals at said provider controller.

16. A method for controlling transmission of at least one optical data plane signal sent from a customer optical interface within a customer's network element in a customer's network towards a provider optical interface within a service provider's network element in a service provider's network, the method comprising:
conveying information representing an acceptable value of at least one of a payload signal mapping property and/or a signal multiplexing property associated with said at least one optical data plane signal, by,
sending said information from a provider controller within a service provider's network to a customer controller at said customer's network element via a customer demarcation control channel conveyed there between, wherein said customer's network element is at least partially, but not entirely, managed within said customer's network, and wherein said customer controller and said provider controller are both managed within said service provider's network, and
receiving said information at said customer controller; and
enabling or prohibiting the transmission of said one or more optical data plane signals in accordance with said information, by,
verifying at said customer controller whether a current operating value of said at least one optical signal parameter and a current operating value of at least one of a payload signal mapping property and/or a signal multiplexing property of said at least one optical data plane signal conforms to said information, and,
enabling said at least one optical data plane signal to transit at least a portion of said optical network if said current operating value is verified as conforming to said information, or prohibiting said at least one optical data plane signal from transiting at least a portion of said optical network if said current operating value is not verified as conforming to said information; and
wherein said control channel is not demodulated with said one or more optical data plane signals at said provider controller.

17. The apparatus of claim 1, wherein said information further comprises:
at least one optical signal parameter.

18. The apparatus of claim 12, wherein said information further comprises:
at least one optical signal parameter.

19. The apparatus of claim 13, wherein said information further comprises:
at least one optical signal parameter.

20. The method of claim 15, wherein:
said information further represents a value of at least one optical signal parameter.

21. The method of claim 16, wherein:
said information further represents an acceptable value of at least one optical signal parameter, and,
said verifying at said customer controller further verifies whether a current operating value of said at least one optical signal parameter of said at least one optical data plane signal conforms to said information.

* * * * *